United States Patent [19]

Kickuth

[11] Patent Number: 5,273,653
[45] Date of Patent: Dec. 28, 1993

[54] METHOD OF, AND INSTALLATION FOR, PURIFYING LIQUIDS IN HORIZONTALLY FLOWN-THROUGH PLANT CONTAINING FILTER BEDS

[76] Inventor: Reinhold W. Kickuth, Feldbergring 11, 3433 Neu-Eichenberg-Hermannrode, Fed. Rep. of Germany

[21] Appl. No.: 27,657

[22] Filed: Mar. 8, 1993

[30] Foreign Application Priority Data

Nov. 4, 1992 [DE] Fed. Rep. of Germany ....... 4237220

[51] Int. Cl.⁵ ............................................. C02F 3/32
[52] U.S. Cl. .................................. 210/602; 210/614; 210/617; 210/747; 210/150; 210/170
[58] Field of Search ............... 210/602, 614, 617, 744, 210/747, 101, 104, 109-111, 116, 135, 137, 170, 150, 151, 134, 251

[56] References Cited

U.S. PATENT DOCUMENTS

| | | | |
|---|---|---|---|
| 4,904,386 | 2/1990 | Kickuth | 210/602 |
| 5,137,625 | 8/1992 | Wolverton | 210/602 |

*Primary Examiner*—Thomas Wyse
*Attorney, Agent, or Firm*—Dougherty, Hessin, Beavers & Gilbert

[57] ABSTRACT

A plant containing filter bed contains a bottom gravel bed below a soil matrix. The bottom gravel bed extends along part of a length of the filter bed from an inlet and is hydraulically connected thereto. Preferably the bottom gravel bed extends at a downwardly directed inclination relative to a bottom of the filter bed at a downward inclination in the throughflow direction in the range of 1% to 5%. Due to the length of the bottom gravel bed, the hydraulic gradient and thereby the throughflow through the soil matrix is internally set, i.e. within the soil matrix in adaptation to an infiltration cross-sectional area.

9 Claims, 3 Drawing Sheets

METHOD OF, AND INSTALLATION FOR, PURIFYING LIQUIDS IN HORIZONTALLY FLOWN-THROUGH PLANT CONTAINING FILTER BEDS

BACKGROUND OF THE INVENTION

The present invention relates to a new and improved method of constructing a plant containing installation for purifying a liquid as well as to a plant containing installation thus constructed.

The present invention also relates to a new and improved method of purifying a liquid by means of a plant containing installation of the aforementioned type.

In its more specific aspects, the present invention particularly relates to a new and improved method of constructing an installation for purifying liquids and which installation comprises a filter bed containing emerse helophyte plants and having an inlet for the liquid to be purified and an outlet for the purified liquid. A gravel bed is installed at the bottom of the filter bed and extends along part of the length of such filter bed. The bottom gravel bed is hydraulically connected to the inlet and defines a dam-up space.

Furthermore, the present invention specifically relates to a new and improved installation for purifying a liquid, such installation comprising a filter bed which contains emerse helophyte plants, an inlet, an outlet and a bottom gravel bed which extends along part of the length of the plant containing filter bed in the flow direction of the liquid to be purified. The bottom gravel bed is hydraulically connected to the inlet and defines a dam-up space.

In its further specific aspects, the present invention relates to a new and improved method of purifying a liquid by passing the same from an inlet through a filter bed containing emerse helophyte plants to an outlet and through a bottom gravel bed which extends along part of the length of the filter bed in the flow direction of the liquid to be purified. The bottom gravel bed is hydraulically connected to the inlet and defines a dam-up space.

Such methods and installations have been described in addition to earlier publications in Published European Patent Application No. 0 243 678 which is cognate with U.S. Pat. No. 4,855,040, granted Aug. 8, 1989, and U.S. Pat. No. 4,904,386, granted Feb. 27, 1990. In the known method and the known installation, the bottom gravel bed is penetrated by lengthwise extending discharge pipes which are provided with adjusting means for adjusting the throughflow on the outlet side. In this manner the bottom gravel bed inclusive of the discharge pipes defines a by-pass flow path bypassing the soil matrix of the plant containing filter bed; this by-pass flow path takes up part of the inflow and enables the throughflow through the plant containing filter bed to be externally adjusted on the outlet side, i.e. externally of the plant containing filter bed.

Among modern methods of waste water treatment the so-called plant waste water treatment installations play an increasingly important role. Therein the waste water purification is effected by means of a passage through a plant containing soil body capable of purifying even uncommon waste waters due to its density of microbial activity and its variety of excessive purification powers. Particular attention is paid to the extremely low utilization of external energy as compared to more conventional processes like the activated sludge process or aerated basin waste water treatment methods.

The designation "plant waste water treatment installation" does not represent a particularly well selected term in view of the fact that the actually effective section therein is constituted by the through-flown soil body which experiences a known physical, chemical and biological activation caused by the plants and which does not require a more detailled description in connection with the subject matter of the instant invention.

The so-called "plant waste water treatment installations" have become additionally attractive because it has been found meanwhile that the initially overestimated specific surface area requirement is not at all excessive but is in the range of 2 m² to 10 m² per population equivalent.

The surface area required for such installation is computed on the basis of the kinetic values of the degradation reactions of the organic load as expressed in terms of $BOD_5$, via a relationship which represents the required surface area as a function of the waste water volume and the extent of its contamination as well as the intended degree of purification:

$$F_x = 5.2 \cdot Qd \cdot \ln(C_0/C_t) \tag{I}$$

Therein $F_x$ is the required surface area in m²,

Qd is the daily volume of water in m³, $C_0$ is the inlet concentration of $BOD_5$ in mg/l, and $C_t$ is the outlet concentration of $BOD_5$ in mg/l, i.e. the extent of purification to be achieved.

The module 5.2 is a specific quantity which results from the kinetic reaction constants of the $BOD_5$ degradation.

The thus determined surface area, however, can not have any desired configuration in horizontally through-flown plant containing filter beds which are the predominantly concerned filter beds, because a predetermined infiltration or throughflow cross-sectional area is, of course, required for the passage or transport of the water volume Qd through the soil body. This infiltration or throughflow cross-sectional area is defined by the rate of flow or filtration v permitted by the soil body, as will be self-evident.

Generally, the transport occurring in the horizontally through-flown filter bed is described by the continuity equation $$\phi = Q/v \tag{II}$$

Therein $\phi$ is the infiltration cross-sectional area, i.e. the input surface area (flow frame) for the waste water in m², Q is the inflow of waste water or the throughflow thereof in m³/sec, and v is the advance rate or linear flow rate of the flowing wave in the through-flown soil body in m/sec, i.e. the filtration rate.

According to Darcy, the flow rate or filtration rate in a soil body can be represented by the following equation:

$$v = k_f \Delta h / \Delta s \tag{III}$$

Therein v is the filtration rate in m/sec, $k_f$ is the permeability coefficient of the soil body in m/sec, and $\Delta h/\Delta s$ is the hydraulic gradient.

Plant waste water treatment installations, particularly the so-called "rootspace beds" which are most consequently based on the productivity of root-permeated top soil under a growth of emerse helophytes, generally are dimensioned for a predetermined depth, mostly 0.6 m, of active space. At the bottom, they are hermetically sealed from the subsoil or the ground water body.

In the thus defined active space or soil matrix there are achieved high permeability coefficients $k_f$ due to the particular selection of the soil but primarily due to the secondary structuring activity of the subterraneous plant organs (roots and rhizoms). The thus obtained permeability coefficients have a magnitude which otherwise is known only in connection with coarser primary granulations.

Thus it could be shown that, subsequent to root permeation for several years of an initial soil having a permeability coefficient of $k_f = 10^{-7}$ m/sec, there can be formed a plant containing filter bed having a $k_f$ value of $5 \cdot 10^{-3}$ m/sec, a $k_f$ value which otherwise is found only in coarse sands. Nevertheless, such high permeability is rather an exception; it is, however, ensured that $k_f$ values of $5 \cdot 10^{-4}$ m/sec can be obtained.

It is herein that there exist system-based problems with regard to the dimensioning and the use of such installations as will be shown hereinbelow.

Computation of a root space installation, which is designed for a population equivalent of 5,000, is based on the usual parameters. Thus there is expected a daily waste water arrival Qd of 750 m$^3$. Assuming an infiltrated waste water proportion of 50 l per population equivalent and day, the inflow into the purification installation will be 1,000 m$^3$/d. When the computation is based on a time period of 10 hrs., an inflow rate of $2.78 \cdot 10^{-2}$ m$^3$/sec will result.

In accordance with common standard data after mechanical prepurification, a BOD load of 45 g per population equivalent and day is assumed for the waste water. The total infeed concentration thus is 225 mg/l BOD$_5$.

The purification goal is intended to be 15 mg/l BOD$_5$.

The surface area required for the plant containing filter bed, then, is $$Fx = 5.2 \cdot 1000 \ln(225/15)$$

in accordance with equation (I) which results in $$Fx = 14{,}082 \text{ m}^2$$

under the indicated conditions. There is thus obtained a specific surface area requirement of 2.82 m$^2$ per population equivalent. This can be readily realized technically and also has been realized frequently.

However, realization of the required infiltration or flow cross-sectional area presents a significant problem as will be shown subsequently. According to equation (II) the flow cross-sectional area is $$\phi = \frac{Q}{k_f \, \Delta h/\Delta s} \quad \text{(IV)}$$

and

-continued $$\phi = \frac{2.78 \cdot 10^{-2} \text{ m}^3/\text{sec}}{5 \cdot 10^{-4} \text{ m/sec} \; \Delta h/\Delta s}$$

Assuming that a hydraulic gradient $\Delta h/\Delta s$ of 5% can be realized which may be accomplished by means of a corresponding bottom slope in the direction of flow, there will result $$\phi = \frac{2.78 \cdot 10^{-2} \text{ m}^3/\text{sec}}{5 \cdot 10^{-4} \text{ m/sec} \cdot 5 \cdot 10^{-2}}$$

and $$\phi = 1{,}112 \text{ m}^2$$

In the event of a depth of the active region or profile depth of 0.6 m, this would translate into an installation width or breadth of 1,853 m (?).

The total surface area of the installation amounts to 14,082 m$^2$. The configuration of the installation thus would be defined by the following dimensions:

7.6 m in the flow direction (flow distance) and 1,853.00 m of the infiltration width or breadth.

Such a hydraulically caused configuration of the surface area can not be managed with regard to the distribution of the liquid to be purified and, considering the passage length of only 7.6 m, can not result in a reliable throughflow pattern and reliable purification.

The system-based problems of such purification processes thus have been demonstrated by the aforediscussed example.

In view of the extraordinary other advantages offered by these purification processes there has been no lack of experiments and proposals for overcoming the heretofore mentioned difficulties.

Firstly, one would be justified to base the operation on a total installation inflow which is uniformly distributed through 24 hrs. This may be accomplished technically, for example, by employing an equalizing basin. Also, the large buffer capacity of the plant containing filter bed as such may be taken into consideration. There is thus obtained an inflow of $1.16 \cdot 10^{-2}$ m$^3$/sec with the result of 18.2 m flow distance and 772.00 m of the infiltration width or breadth.

There is not much gained in principle by these measures because also this configuration of the surface area will result in hardly surmountable distribution problems and a passage length of 18.2 m hardly will produce a homogeneous throughflow pattern.

Only marginally are here to be mentioned the problems connected with economically positioning such surface area in the terrain.

Practical experiments of significantly increasing the bottom slope, for example, to about 10%, result in different hydraulic difficulties, for instance, in discharge of water through the surface of the soil body prior to termination of the passage. Furthermore, also in this case, there can not be produced a surface area of a configuration which would be technically realizable and which would be desirable in terms of waste water technology.

In a few cases recourse was taken to subdividing the surface area into a number of partial surface areas but also this measure soon reaches its limits. Above all, the technical expense increases to such significance that reasonable construction costs can no longer be realised.

Each part-bed must have input and output units provided with respective adjusting means and the same or proportional waste water volume must be allocated to the different part-beds. No useful technical solution has hitherto been developed for solving this problem.

A last known possibility of solving the hydraulic problems while maintaining the passage through the soil resides in selecting a vertical infiltration mode. This is comparatively frequently put into use although this process variant has its particular difficulties and also its imponderabilities. Firstly, it is difficult to achieve uniform distribution of the waste water across larger surface areas. In most cases distribution by spraying is out of consideration due to the nuisance connected therewith. Likewise, a free, open waste water surface on the soil body is generally not considered acceptable. Above all, however, the $k_f$ values are differently developed and any counterregulation is impossible. Also, a passage through a maximum of 1 m of active root space is rarely sufficient for reliable purification through contact with the active structures present in the soil body.

Numerous project engineers, therefore, have turned away from employing the highly complex and highly active soil matrix of plant containing filter beds and utilize instead throughflown gravel beds and coarse sand beds for waste water purification, evidently inclusive of all the losses in purification power and biochemical versatility, which are properties characterizing a soil and also desirable in view of the xenobiotica always present even in domestic waste water.

SUMMARY OF THE INVENTION

Therefore, with the foregoing in mind it is a primary object of the present invention to provide a new and improved method of, and installation for, purifying a liquid as well as a new and improved method of constructing such installation and which methods and installation are not afflicted with the drawbacks and limitations of the prior art heretofore discussed.

Another and more specific object of the present invention is directed to a new and improved method of, and installation for, purifying liquids as well a new and improved method of constructing such installation and which methods and installation provide a surface area configuration which is technically useful in practice, i.e. has a value of the ratio between infiltration width or breadth and flow length which value is technically useful in practice.

It is a highly significant object of the invention to provide a new and improved method of constructing a plant containing installation for purifying liquids and which method permits a wide variability in selecting the construction parameters of the plant containing installation substantially independent of the respective construction site.

Now in order to implement these and still further objects of the invention, which will become more readily apparent as the description proceeds, the method of the present development is manifested by the features that, among other things, an infiltration cross-sectional area is selected which corresponds to constructional conditions. The bottom gravel bed is constructed in a manner such that the flow distance from an outlet end of the bottom gravel bed to a discharge location at the outlet results in a hydraulic gradient corresponding to the selected infiltration cross-sectional area. This construction establishes, for the liquid to be purified, a percolating level which extends immediately at the surface of the plant containing filter bed up to the outlet end of the bottom gravel bed under the action of an artesian pressure built up in the bottom gravel bed.

According to a further aspect, these and still further objects are implemented in the installation of the present development by the features that, among other things, a percolating level extends through the plant containing filter bed and is raised up to the surface of the plant containing filter bed due to an artesian pressure built up in the bottom gravel bed during operation of the installation, an infiltration cross-sectional area is formed at the inlet in correspondence with constructional conditions and homogeneously throughpassed by the liquid to be purified during operation of the installation, and a hydraulic gradient determined by the length of the bottom gravel bed is defined in the plant containing filter bed and extends from an outlet end of the bottom gravel bed to a discharge location at the outlet.

As alluded to above, the invention is not only concerned with the structure of the inventive installation but also relates to a new and improved method of operating the same. Accordingly, there are required the steps of passing the liquid to be purified through the plant containing filter bed along a percolating level which is raised up to the surface of the plant containing filter bed along the length of the bottom gravel bed due to an artesian pressure built up in the bottom gravel bed. The liquid to be purified is homogeneously passed through an infiltration cross-sectional area selected in correspondence with constructional conditions. From an outlet end of the bottom gravel bed, the liquid to be purified is flown through the plant containing filter bed to a discharge location at an outlet at a hydraulic gradient which is determined by the selected length of the bottom gravel bed.

The invention is based on the recognition that the bottom gravel bed has a higher hydraulic conductivity than the soil matrix of the plant containing filter bed and that, as a consequence thereof, an upwardly directed artesian pressure component is superimposed onto the flow pressure prevailing in the soil matrix. There is thus achieved a throughflow which horizontally and homogeneously passes through the plant containing filter bed along a distance which is determined by the bottom gravel bed. The infiltration cross-sectional area is selected such as to correspond to the constructional conditions and in a manner such that the aforementioned homogeneous throughflow is realizable. The adaptation to the throughflow as required by the inflow, then, is effected by the adjustment or setting of the hydraulic gradient between the outlet end of the bottom gravel bed and the discharge location at the outlet. According to the invention the infiltration cross-sectional area may thus be selected within wide limits so as to be technically realistic and to meet the purification goal.

Surprisingly it has been found additionally that the development of the plant roots and rhizoms is favourably affected by such artesian pressure component, particularly with respect to the in-depth development of the soil.

This is obviously connected with the fact that the subterraneous plant organs grow towards the water which flows thereto from below and contains dissolved nutrients; contrary thereto, the plants tend to develop large biomasses only in the region of the upper 20 cm to 30 cm in the event of an infeed close to the surface while the lower zones of the soil body are developed to a much lesser extent.

Advantageously, the bottom gravel bed in the inventive method and installation is disposed at a downward inclination relative to the bottom of the filter bed, preferably in the range of 1% to 5%.

BRIEF DESCRIPTION OF THE DRAWINGS

The invention will be better understood and objects other than those set forth above, will become apparent when consideration is given to the following detailed description thereof. Such description makes reference to the annexed drawings wherein the same or analogous components are designated by the same reference characters and wherein.

DETAILED DESCRIPTION OF THE PREFERRED EMBODIMENT

Figure 1:
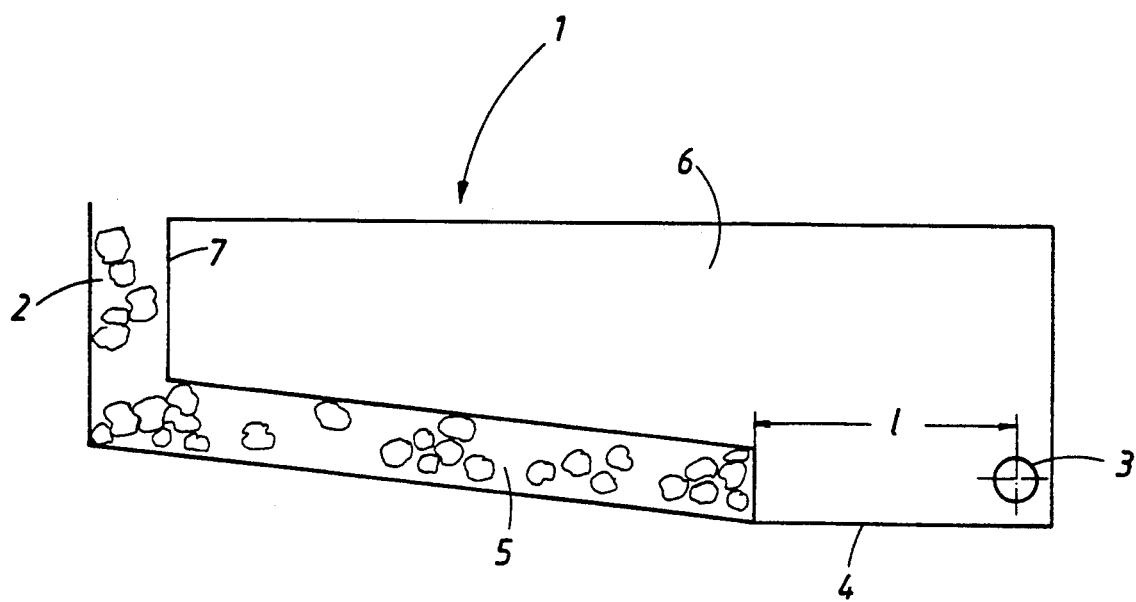
FIG. 1 shows a schematic longitudinal section through an exemplary embodiment of the plant containing filter bed according to the invention.

Describing now the drawings, it is to be understood that only enough of the construction of the plant containing filter bed has been shown as needed for those skilled in the art to readily understand the underlying principles and concepts of the present development, while simplifying the showing of the drawings. Turning attention now to FIG. 1 of the drawings, there is shown therein in a schematic longitudinal section through a filter bed 1 which contains emerse helophyte plants and which is provided at one end face with an inlet 2 in the form of a gravel filled inlet ditch. An outlet 3 is located at the opposite end face and contains an outlet pipe constructed, for example, as a drain pipe which receives the purified liquid issuing from the filter bed 1 and passes the same to a control chamber or receiving water. The bottom 4 and the side walls of the filter bed 1 are covered by a foil impervious to water.

Generally, the construction and preparation of plant containing filter beds is known in principle from the initially recited literature. It is mentioned herein only briefly and summarily that a bed having a size which is determined by the respective purpose of use, is excavated and covered at the bottom and at the side walls by a membrane or foil which is impermeable for the liquid to be purified. On the oppositely disposed end walls there are constructed the inlet 2 for infeeding the liquid to be purified into the plant containing filter bed 1 and the outlet 3 for receiving the purified liquid discharged from the plant containing filter bed 1 and for feeding the purified liquid to, for example, a receiving water. The excavated bed is filled with a suitable soil body, for example, grey-brown podzolic soil (B-horizont) or a monolithic clayey sand and therein are planted emerse helophytes selected, for instance, from the species Phragmites, Iris, Scirpus and the like. Generally, the plants utilized for this purpose are capable of supplying oxygen via their aerenchymatic tissue to their root system and the adherent root space and thereby form, in the hydromorphous soil matrix of the plant containing filter bed 1, a pattern of small aerobic and anaerobic compartments which are responsible for the purification power of the plant containing filter bed 1.

A bottom gravel bed 5 having a thickness of 15 cm to 20 cm is disposed intermediate the filter bed 1 and the foil sealing the same from the body of ground water. The bottom gravel bed 5 is hydraulically connected with the inlet 2.

As shown in FIG. 1 the bottom gravel bed 5 has a smaller length L than the plant containing filter bed 1 and extends at a downwardly directed inclination relative to the bottom 4 of the plant containing filter bed 1. This inclination is defined by a bottom slope in the range of 1% to 5%.

An active soil matrix 6 having an infiltration cross-sectional area 7 is developed in the plant containing filter bed 1 under the action of the emerse helophytes in known manner.

Figure 2:
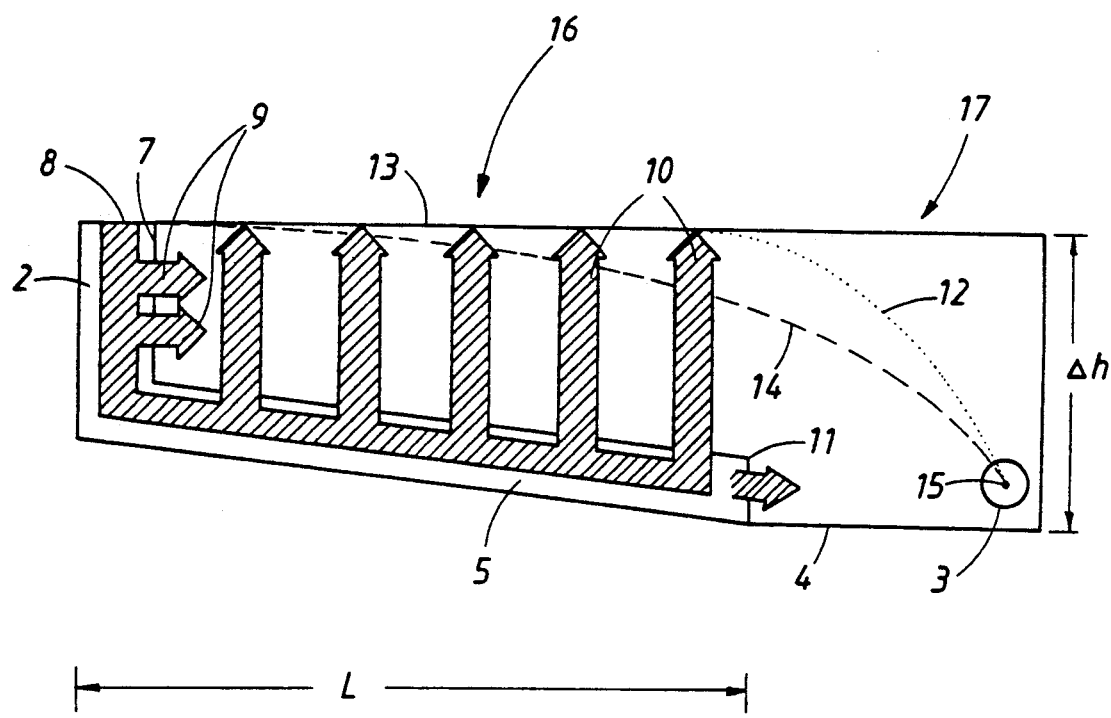
FIG. 2 is a diagram showing the pressure conditions and the percolating or infiltration level prevailing in the plant containing filter bed as illustrated in FIG. 1.

The effect produced by the configuration as shown in FIG. 1 is schematically illustrated in FIG. 2. Therein the plant containing filter bed 1 will be recognised as well as the inlet 2, the outlet 3, the bottom 4, the sloping bottom gravel bed 5, the soil matrix 6 and the infiltration cross-sectional area 7. The liquid level at the inlet 2 is designated by the reference numeral 8; from the inlet 2 the liquid to be purified enters the soil matrix 6 and the bottom gravel bed 5 through the infiltration cross-sectional area 7 and traverses the soil matrix essentially in horizontal direction in correspondence with the flow pressure as indicated by the arrows 9. As a consequence of the higher hydraulic conductivity of the bottom gravel bed 5 in comparison to the soil matrix 6, an artesian pressure builds up along the length L of the bottom gravel bed and extends normally and upwardly to the flow pressure, as indicated by the arrows 10. Due to the inclination of the bottom gravel bed 5, this artesian pressure increases up to the outlet end 11 of the bottom gravel bed 5. This has the effect that the dotted percolating or infiltration level 12 of the liquid passing through the soil matrix 6, extends up to the outlet end 11 of the bottom gravel bed 5 in substantially horizontal manner and at, i.e. closely parallel to the surface 13 of the soil matrix 6 and virtually at the liquid level 8 in the inlet 2. For purposes of comparison, the percolating or infiltration level 14 of a conventional plant containing filter bed is shown in a broken line in FIG. 2. With respect to the percolating or infiltration level and its determination reference is made to a dissertation by B. O. Lüken at the Gesamthochschule Kassel, Germany, 1989, entitled "Phänomene der hydraulischen Leitfähigkeit dauernd hydromorpher Böden" which translates to "Phenomena of Hydraulic Conductivity of Permanently Hydromorphous Soil Matrices".

For trouble-free operation of the installation it is necessary that a constant liquid level 8 is maintained in the inlet 2 which generally will be constructed in the manner of an inlet ditch, at the level of the surface 13 of the plant containing filter bed 1. For this purpose the inlet ditch may be provided in known manner with an overflow device which receives supernatant liquid and compensates for any shortage of liquid.

There thus results in the soil matrix 6, as a consequence of the artesian pressure issuing from the bottom gravel bed 5, the formation of two sections having different throughflow conditions: In a first section 16 which extends along the length L of the bottom gravel bed 5 from the inlet 2 up to the outlet end 11 of the bottom gravel bed 5, the entire soil matrix 6 is substantially horizontally throughpassed by the liquid to be purified in correspondence with the percolating or infiltration level 12. In a second section which extends along the remaining length l of the plant containing filter bed 1 from the outlet end 11 of the bottom gravel bed 5 to the outlet 3, the soil matrix 5 is throughpassed by the liquid to be purified in correspondence with the percolating or infiltration level 12 at a relatively steep hydraulic gradient Δh/Δs because the flow distance Δs thereof is determined by the merely short remaining length l.

Altogether there is thus obtained the result that the throughflow or purification power of the plant containing filter bed 1 can be adapted to respective local requirements by selecting, during construction of the installation, the infiltration cross-sectional area 7 in conjunction with the length L of the bottom gravel bed 5 or the remaining length l of the plant containing filter bed 1 in accordance with equation (IV). In such configuration the throughflow Q through the soil matrix 6 thus is internally adjusted, i.e. within the soil matrix 6. For realizing an installation satisfying the initially mentioned conditions (1,000 m³/d; 1.16·10⁻² m³/sec uniform inflow through 24 hrs.), the following data are obtained:

Fx (equation I) = 14,082 m²;

total length = 100 m and, computed therefrom, infiltration width = 140.8 m.

Based on the usual infiltration depth of 0.6 m, there will be obtained an infiltration cross-sectional area of $\phi = 84.5$ m².

The desired throughput of $1.16 \cdot 10^{-2}$ m³/sec is obtained from equation (IV) if $$\Delta h/\Delta s = \frac{Q}{k_f \cdot \phi} = \frac{1.16 \cdot 10^{-2}}{5 \cdot 10^{-4} \cdot 84.5} = 0.2746$$

and $$\Delta s = \frac{\Delta h}{0.2746} = \frac{0.6}{0.2746} = 2.18,$$

i.e. the remaining length l of the plant containing filter bed 1 is approximately 2.18 m or, correspondingly, the horizontal length L of the bottom gravel bed 5 is about 97.8 m.

It should be noted, however, that the foregoing computational results are obtained
   a) without considering a constructionally realizable bottom inclination and
   b) without taking account of the fact that the level of the soil top surface and the level of the installation bottom diverge from each other due to different gradients such as, for instance, 1% for the soil top surface and 5% of the installation bottom.

It will be recognized that a multitude of numeric constellations and possibilities will result which provide the project engineer with wide margins and, in any case, unambiguously establish the length and position of the bottom gravel bed 5 under certain preconditions or allow, in correspondence with the novel possibility, defined preconditions for configuring a plant waste water purifying installation. By combination with other problem solution suggestions such as subdivision into two operating units, which is technically simple and mostly also desirable, corresponding solutions can be found in more complicated cases and for larger-size installations.

In known manner a short-circuiting conduit can be led from the bottom gravel bed 5 to the exterior of the installation; such short-circuiting conduit can be opened in cases of emergency and permits complete and rapid drain of the installation.

Figure 3:
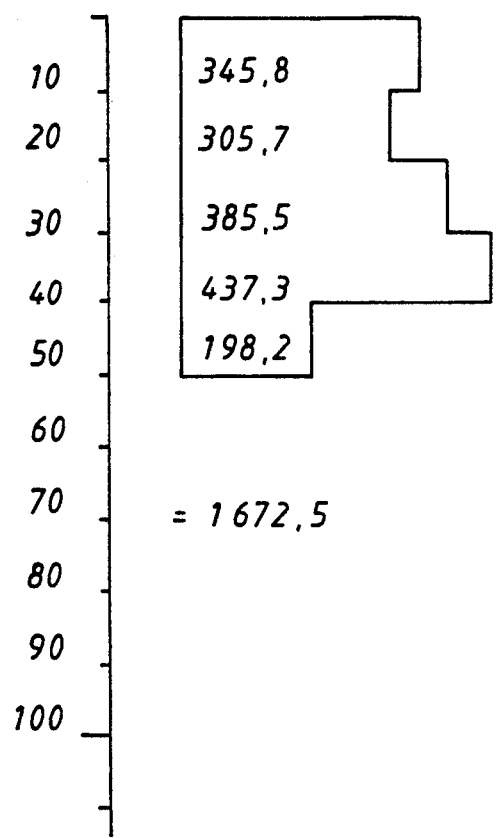
FIG. 3 is a diagram showing the dry mass in g/m$^2$ of the subterraneous plant organs present in the soil matrix of the inventive plant containing filter bed as a function of depth in comparison to a prior art soil matrix.
Figure 3:
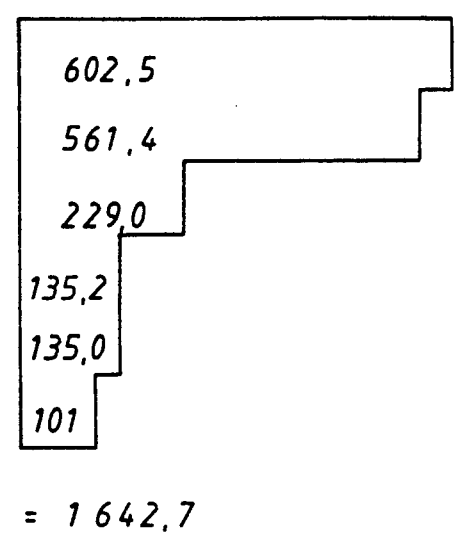

FIG. 3 is a diagram showing, as a function of depth up to 0.6 m, sub A the root permeation of the soil matrix of a conventional filter bed planted with emerse helophytes in the absence of a bottom gravel bed and, sub B, the root permeation of the soil matrix 6 of a filter bed which is analogous to the filter bed 1 shown in FIG. 1 and which contains a bottom gravel bed 5 564 of 10 cm thickness. The plant containing filter beds were in comparable states of development. The weight of the dry mass in g/m² of the subterraneous plant organs serves as a measure of the degree of root permeation; samples were taken and investigated in the following manner:

Plants and detritus were removed from a measured portion of the plant containing filter bed; subsequently, a steel box measuring 1 m × 0.5 m × 0.5 m was driven into the filter bed. Along one side thereof, the steel box contained a number of slots at a mutual spacing of 10 cm; starting from an excavated pit, steel sheets were inserted along guides through the slots into the filter bed. From each 10 cm layer of the filter bed thereby obtained, the adhering soil was removed by flushing. The remaining subterraneous plant organs of each 10 cm layer were dried in a drying oven at 105° C. until the weight remained constant which required approximately 3 days. The weight of the dry masses thus obtained is given in FIG. 3.

It will be immediately apparent from a comparison of diagrams sub A and sub B that the soil matrix 6 in which the bottom gravel bed 5 was present, has a uniform, well developed root permeation extending to comparatively greater depth and close to the bottom gravel bed 5. Contrary thereto, the conventional soil matrix has a stronger root growth in the upper layers and, then, a rapidly decreasing and less well developed root permeation in the lower layers.

While there are shown and described present preferred embodiments of the invention, it is to be distinctly understood that the invention is not limited thereto, but may be otherwise variously embodied and practiced within the scope of the following claims.

Accordingly, what I claim is:

1. A method of constructing a plant containing installation for purifying a liquid, comprising the steps of:
   installing, at a given construction site, a filter bed having a predetermined length, an inlet defining an infiltration cross-sectional area for liquid to be purified, an outlet defining a discharge location for purified liquid, a bottom and a top surface;
   prior to installing said filter bed, laying on a bottom gravel bed placed at a bottom of said construction site of the filter bed and extending from said inlet of said filter bed along a predeterminate length, which is part of said predetermined length of said filter bed, to an outlet end of said gravel bed;
   hydraulically connecting said bottom gravel bed to said inlet of said filter bed in order to thereby form a dam-up space for building up an artesian pressure during operation of said filter bed and thereby raising a percolating level of said liquid, which is to be purified and flows through said filter bed, so as to extend immediately at said top surface of said filter bed along said predeterminate length of said bottom gravel bed;

dimensioning said infiltration cross-sectional area defined by said inlet of said filter bed, in correspondence with constructional conditions prevailing at said construction site;

placing said outlet end of said bottom gravel bed at a preselected flow distance from said discharge location of the outlet of said filter bed;

preselecting said flow distance in relation to said infiltration cross-sectional area at the inlet of said filter bed in order to provide, during operation of said filter bed, a hydraulic gradient along said preselected flow distance and which hydraulic gradient corresponds to said infiltration cross-sectional area; and planting emerse helophyte plants in said filter bed.

2. The method as defined in claim 1, wherein said step of laying on said bottom gravel bed entails constructing the bottom gravel bed at a predetermined downwardly directed inclination relative to the bottom of said filter bed and as viewed in the throughflow direction of the liquid to be purified.

3. The method as defined in claim 2, wherein said step of constructing said bottom gravel bed entails selecting, as said predetermined downwardly inclined direction, a bottom slope in the range of 1% to 5% relative to the bottom of said filter bed and as viewed in the throughflow direction of the liquid to be purified.

4. A method of purifying a liquid using a plant containing installation, comprising the steps of:

substantially homogeneously passing liquid to be purified through an infiltration cross-sectional area defined at an inlet of an emerse helophyte plants containing filter bed and dimensioned in correspondence with constructional conditions prevailing at the construction site of said emerse helophyte plants containing filter bed;

passing said liquid to be purified from said inlet through said emerse helophyte plants containing filter bed at a percolating level extending substantially at and parallel to a top surface along a predeterminate length which is part of a predetermined length of said emerse helophyte plants containing filter bed;

hydraulically connecting a bottom gravel bed to said inlet of said emerse helophyte plants containing filter bed and which bottom gravel bed extends at the bottom of said emerse helophyte plants containing filter bed from said inlet along said predeterminate length to an outlet end of said bottom gravel bed and defines a dam-up space;

substantially simultaneously with said step of passing said liquid to be purified through said emerse helophyte plants containing filter bed at said percolating level, passing said liquid to be purified through said bottom gravel bed;

during said step of passing said liquid to be purified through said bottom gravel bed, damming up said liquid to be purified at said outlet end of said bottom gravel bed and thereby building up an upwardly acting artesian pressure for raising said percolating level of said liquid, which is to be purified and flows through said emerse helophyte plants containing filter bed, to said top surface of said emerse helophyte plants containing filter bed substantially along said predeterminate length which is defined by the length of said bottom gravel bed between said inlet and said outlet end of said bottom gravel bed; and flowing said liquid to be purified at a hydraulic gradient which corresponds to said infiltration cross-sectional area at the inlet of said emerse helophyte plants containing filter bed and extends along a preselected flow distance from said outlet end of said bottom gravel bed to a discharge location which is formed at an outlet of said emerse helophyte plants containing filter bed, said flow distance being preselected in relation to said infiltration cross-sectional area at said inlet of said emerse helophyte plants containing filter bed.

5. The method as defined in claim 4, wherein said step of passing said liquid to be purified through said bottom gravel bed includes passing said liquid to be purified through a bottom gravel bed having a downwardly directed inclination relative to a bottom of said emerse helophyte plants containing filter bed and as viewed in the throughflow direction of the liquid to be purified.

6. The method as defined in claim 5, wherein said step of passing said liquid to be purified through said bottom gravel bed includes passing said liquid to be purified through a bottom gravel bed having a downwardly directed inclination in the range of 1% to 5% relative to said bottom of said emerse helophyte plants containing filter bed and as viewed in the throughflow direction of the liquid to be purified.

7. A plant containing installation for purifying a liquid, comprising:

an emerse helophyte plants containing filter bed having an inlet and an outlet defining a predetermined length therebetween, and further having a bottom and a top surface;

a bottom gravel bed extending at said bottom of said emerse helophyte plants containing filter bed along a predeterminate length which is part of said predetermined length of said emerse helophyte plants containing filter bed;

said bottom gravel bed being hydraulically connected with said inlet of said emerse helophyte plants containing filter bed and having an outlet end;

said bottom gravel bed, during operation of said emerse helophyte plants containing filter bed, forming a dam-up space for damming up liquid, which is to be purified and flows through said bottom gravel bed, and building up an artesian pressure upwardly acting upon liquid, which is to be purified and flows through said emerse helophyte plants containing filter bed, in order to thereby raise a percolating level of said liquid to be purified to said top surface of said emerse helophyte plants containing filter bed substantially along said predeterminate length of said bottom gravel bed;

said inlet defining an infiltration cross-sectional area selected in correspondence with constructional conditions prevailing at the construction site of said emerse helophyte plants containing filter bed;

said outlet of said emerse helophyte plants containing filter bed defining a discharge location for purified liquid;

a preselected flow distance extending from said outlet end of said bottom gravel bed to said discharge location at said outlet of said emerse helophyte plants containing filter bed; and said preselected flow distance being preselected in relation to said infiltration cross-sectional area at said inlet of said emerse helophyte plants containing filter bed and defining, during operation of said emerse helophyte plants containing filter bed, a hydraulic gradient which corresponds to said infiltration cross-sectional area at said inlet of said emerse helophyte plants containing filter bed.

8. The installation as defined in claim 7, wherein said bottom gravel bed extends at a downwardly directed inclination to said bottom of said emerse helophyte plants containing filter bed as viewed in the throughflow direction of the liquid to be purified.

9. The installation as defined in claim 8, wherein said bottom gavel bed has a downwardly directed inclination in the range of 1% to 5% to said bottom of said emerse helophyte plants containing filter bed as viewed in the throughflow direction of the liquid to be purified.

* * * * *